US006434674B1

(12) United States Patent
DeWilde et al.

(10) Patent No.: US 6,434,674 B1
(45) Date of Patent: Aug. 13, 2002

(54) MULTIPORT MEMORY ARCHITECTURE WITH DIRECT DATA FLOW

(75) Inventors: Mark DeWilde, Freevillle; Stephen Stone, Whitney Point, both of NY (US)

(73) Assignee: Advanced Digital Information Corporation, Redmond, WA (US)

( * ) Notice: Subject to any disclaimer, the term of this patent is extended or adjusted under 35 U.S.C. 154(b) by 0 days.

(21) Appl. No.: 09/542,585

(22) Filed: Apr. 4, 2000

(51) Int. Cl.[7] .............................................. G06F 13/16
(52) U.S. Cl. ...................... 711/149; 710/129; 710/126; 710/52
(58) Field of Search .................... 359/139; 375/372; 710/129, 52, 126, 127, 128, 35, 31; 711/149

(56) References Cited

U.S. PATENT DOCUMENTS

| | | | | |
|---|---|---|---|---|
| 4,899,352 A | * | 2/1990 | Cucchi et al. | 375/372 |
| 5,490,007 A | * | 2/1996 | Bennett et al. | 359/139 |
| 5,982,443 A | * | 11/1999 | Chung | 348/441 |
| 6,151,322 A | * | 11/2000 | Viswanath et al. | 370/395 |

* cited by examiner

Primary Examiner—B. James Peikari
(74) Attorney, Agent, or Firm—Salzman & Levy (57) ABSTRACT

The present invention provides a high speed, multi-ported, direct data flow memory architecture that employs memory width and speed greater than system bus width and speed to allow shallow burst depth and reduce other-port latencies, while maintaining multi-port throughput. The inventive system has a data storage device (SDRAM) and a multiplexer connected to the SDRAM. Two or more interfaces or ports are provided with data sourcing controllers respectively connected to the interfaces. A communications bus connects the SDRAM to the data sourcing controllers for facilitating data communications. A FIFO buffer memory is located between the multiplexer and the data sourcing controllers. The need for retries is eliminated and host bus widths are matched to memory data width. Read-ahead algorithms are provided that adapt the larger system bus burst sizes to the smaller memory burst sizes with the ability to cancel unneeded advance requests for data. The total memory bandwidth is greater than that of the sum of the ports, so that the small memory burst size inefficiency does not reduce throughput below target levels. Write data is selectively masked to eliminate the need for read-modify-write cycles. Reads and writes can begin and end on arbitrary byte addresses, regardless of memory or bus widths.

20 Claims, 4 Drawing Sheets

MULTIPORT MEMORY ARCHITECTURE WITH DIRECT DATA FLOW

FIELD OF THE INVENTION

The present invention relates to computer memory architecture and, more particularly, to high speed, multi-ported, direct data flow memory architecture.

BACKGROUND OF THE INVENTION

Many computer I/O systems utilize a buffered data flow protocol. With such architecture, data is moved into the system through one interface, is buffered temporarily, and is then moved out of another interface. Often the data path is separate from the command/control path, but it need not be.

To increase overall system bandwidth, it is highly desirable to move the data over a given system bus or data pathway only once. Multi-ported memory architectures are used to buffer data, while satisfying this single pathway requirement. Data is input through one port and output through another.

The most common memory of this type is dual-port, but higher numbers of ports are also used. The memories may be implemented to function with component-level buses or with system-level buses, such as PCI. The latter has become a preferred component interconnection means due to the large numbers of personal computers using the bus, and the peripheral devices supporting it.

Multiple port memory architectures are generally implemented today in one of two ways. The first method uses memory composed of true multi-ported memory cells and is found in certain static random access memories (SRAMs). The second method uses a single-ported memory array (typically DRAM of some sort) with a multiplexing scheme that alternately permits one of several ports to access the memory one at a time. If the speed of the memory is significantly higher than that of the ports, and a speed-matching (synchronizing) mechanism is provided, then the memory may appear to be simultaneously accessed by multiple ports. This method is used by most PC bridge chip sets to multi-port a single bank of memory to a processor, a system I/O bus and a video bus.

A true dual-ported SRAM structure has certain advantages, among which are:

a) random accesses may occur on each port simultaneously without causing any access delay at the other port;

b) the initial access to a sequential block of memory takes the same time as do all subsequent accesses, so there is no initial access overhead time penalty; and c) dual port SRAM designs are inherently simple, since multiplexing is not necessary.

Unfortunately, true dual-ported SRAM memory systems have certain disadvantages, also, among which are:

a) the memory is limited to only two ports;

b) the density of the memory is relatively low, typically requiring many chips per megabyte; and c) the cost of the memory is very high, typically an order of magnitude more than the cost of DRAM.

The advantages and disadvantages of a multi-ported DRAM architecture, on the other hand, are opposite those of the SRAM. When an application requires more than 100 Kbytes of buffering, the cost of multi-port SRAM becomes prohibitive.

If more than two ports are required, a multiplexing scheme must be implemented, raising the overall cost of the system. In these cases, the most cost effective method of implementing a multi-ported RAM is by using a multiplexed DRAM architecture.

In typical operation, a device reads or writes data in blocks to and from the buffer memory. The size of these blocks varies according to the application. A memory controller usually performs memory accesses in fixed sizes, with the width and depth of the access set to a predetermined burst size. On a read from memory, when an external device uses more than one memory burst of data, the memory controller performs additional accesses as necessary. When the external device uses less than one burst of data, the additional data fetched from memory is discarded.

On a write to memory of one or more full bursts, the controller performs the write operation. If the write is only to a portion of the fixed size block in memory, the controller reads the data block from memory, modifies the correct portions, and then writes the block back. Additional memory bandwidth may be required if complex caching is not performed.

DRAMs typically require several addressing and start-up cycles to begin an access to a consecutive block of data. This overhead requirement is therefore fixed, regardless of the data read or written. As a result, the effective data bandwidth increases with larger data transfer bursts, due to the overhead being averaged over a greater amount of data actually moved. For a single memory port, the longer the burst at a given clock speed, the greater the available bandwidth of the port. When implementing a multi-port memory, however, the metric (parameter) of interest is not the raw bandwidth of a single port. Instead, it is the net bandwidth that is important, across a pair of ports when one port writes data to memory, and the other port reads data from memory. In this situation, a long burst on one port adds an access delay to the other port, which results in additional overhead on that other port. Of course, if the data bursts are always very long, this overhead may be small compared with data volume, resulting in acceptable performance.

If the application does not require large data bursts or uses a mix of large and small bursts, a large memory access size causes a highly inefficient use of the bandwidth, resulting in an unacceptable performance. This inefficiency arises from discarding great amounts of unused data on reads, and reading and then writing great amounts of unmodified data on writes. Reducing the memory access size is advantageous; but, without additional mechanisms for intelligently mapping the variable sized device data transfers to the smaller fixed memory accesses performed by the controller, poor performance results.

As a numerical example, consider a memory with a 6-clock cycle access overhead (i.e., the time from initial request to first data is six clock cycles at the memory clock speed). If two ports request access simultaneously, then one must wait for the other to complete. Assuming a 66 Mhz clock, 32-bit memory width, one clock cycle of port arbitration and the first port winning access, Table I indicates the data bandwidth of the ports as a function of the memory burst size for one burst.

TABLE I

| Burst Size (32-bit words) | Port 1 clocks to move burst | Port 1 Peak MB/sec | Port 2 clocks to move burst | Port 2 Peak MB/sec | Dual Port Throughput |
|---|---|---|---|---|---|
| 1 | 7 | 38.1 | 15 | 17.8 | 12.1 |
| 2 | 8 | 66.7 | 17 | 31.4 | 21.3 |

TABLE I-continued

| Burst Size (32-bit words) | Port 1 clocks to move burst | Port 1 Peak MB/sec | Port 2 clocks to move burst | Port 2 Peak MB/sec | Dual Port Throughput |
|---|---|---|---|---|---|
| 4 | 10 | 106.7 | 21 | 50.8 | 34.4 |
| 8 | 14 | 152.4 | 29 | 73.6 | 49.6 |
| 16 | 22 | 193.9 | 45 | 94.8 | 63.7 |
| 32 | 38 | 224.6 | 77 | 110.8 | 74.2 |
| 64 | 70 | 243.8 | 141 | 121.0 | 80.9 |
| 128 | 134 | 254.7 | 269 | 126.9 | 84.7 |
| 256 | 262 | 260.6 | 525 | 130.0 | 86.7 |
| 512 | 518 | 263.6 | 1037 | 131.7 | 87.8 |
| 1024 | 1030 | 265.1 | 2061 | 132.5 | 88.3 |
| 2048 | 2054 | 265.9 | 4109 | 132.9 | 88.6 |
| 4096 | 4102 | 266.3 | 8205 | 133.1 | 88.8 |
| 8192 | 8198 | 266.5 | 16397 | 133.2 | 88.8 |
| 16384 | 16390 | 266.6 | 32781 | 133.3 | 88.9 |

As can be seen, the actual dual port throughput, which is the amount of data that can be moved into port 1 and out of port 2, is lower than the peak rates of either port. These rates do not include any overhead for the PCI busses to which they are connected. It can also be seen that the throughput levels off and does not approach the 132 MB/sec that a 32-bit PCI bus can sustain. Increasing burst size alone cannot deliver high multi-port throughput.

The throughput numbers shown above also assume that all of the data read from the memory is used. If only a small fraction of the fixed size memory burst data is actually used, then the fixed-size larger bursts may actually waste memory bandwidth; the effective throughput decreases to a greater extent. If the data required and actually used were 512 bytes (128 32-bit words) and the memory burst size were set to 256 32-bit words, for example, then the effective throughput would be one half of that shown. If all of the PCI transfers are not at least as large as the memory burst, then bandwidth is wasted and effective throughput decreases.

Another problem arises when PCI-delayed read transactions are performed. The PCI specification requires a target to issue a retry instruction if the latency for a read access is significant (i.e., exceeds a maximum preset number of bus clock cycles). With larger and larger memory bursts on the other ports of the memory, the latency for a given port to gain entry to the DRAM grows, forcing the target to issue retries. In these bus transactions, a data read is first posted at the interface, and the target interface issues a disconnect instruction. The target then prefetches the read data and waits for the master to retry the data access. When it does, the data is provided.

Whenever the number of PCI clock cycles required for a retry plus those required to restart the access is less than the number required to access the first data of a burst, there is some advantage to these split transactions. However, if the PCI accesses are performed in small bursts, then this rule is not met, and throughput suffers more. As an example, consider a PCI burst of 128 bytes (32 words of 4 bytes each). Assuming one other intervening transfer, the bus activity is as follows:

Device 1
1 clock cycle of arbitration,
1 clock cycle for address,
1 clock cycle for turn-around,
1 clock cycle to receive the retry,
1 clock cycle bus idle;
Device 2
1 clock cycle of arbitration,
1 clock cycle for address,
1 clock cycle for turn-around,
1 clock cycle to receive the retry,
1 clock cycle bus idle;
Device 1
1 clock cycle of arbitration,
1 clock cycle for address,
1 clock cycle for turn-around,
32 clock cycles to receive the data,
1 clock cycle bus idle.

The total time is 46 clock cycles which, at 33 Mhz, is 92.7 MB/sec. This assumes that the memory access is less than 10 PCI clock cycles, including the worst case access time of the other port into the memory. If the memory were to take one additional clock cycle to access the first data, then another retry would be issued, and another 6 clock cycles would be added to the transfer time, reducing throughput further. It can thus be seen that the ports are coupled. Larger memory bursts on one port introduce larger latencies and more retries on the other ports, which result in lower throughput.

It would be advantageous to provide a multi-port memory architecture optimized for both large and small bus data packets.

It would also be advantageous to provide a memory width and burst depth determination algorithm based on the number of ports, host data bus width and burst length, and host bus clock rate that would guide the design of a memory system implementing the architecture.

It would further be advantageous to provide an adaptive read pre-fetch algorithm for use with a multi-port memory architecture that would increase the efficiency of memory use and the obainable memory throughput. It would still further be advantageous to provide a memory data masking method to eliminate the need for read-modify-write cycles to alter portions of the wide memory words used in this architecture to give the other advantages listed without the speed penalties of read-modify-write cycles.

SUMMARY OF THE INVENTION

In accordance with the present invention, there is provided a high speed, multi-ported, direct data flow memory architecture that permits memory width and basic transfer speed greater than system bus width and transfer speed to allow shallow burst depth and reduce other-port latencies, while maintaining high multi-port throughput. The inventive system has a data storage device (SDRAM) and a multiplexer connected to the SDRAM. The multiplexer provides matching between the memory data width and the port data width. Two or more interfaces or ports are provided with data sourcing controllers respectively connected to the interfaces. A communications bus connects the SDRAM to the data sourcing controllers for facilitating data communications. A FIFO buffer memory is located between the multiplexer and the data sourcing controllers. The FIFO buffers act as temporary data storage, and match the rate of data transfer of the port to the higher rate of the memory. The need for retries is eliminated by making the total amount of time required by the memory controller to satisfy the other ports' requests less than the time-out value that would require a retry to be generated. Read-ahead algorithms are provided that adapt the larger system bus burst sizes to the smaller memory burst sizes, without creating the need for additional retries, and with the ability to cancel unneeded advance requests for data. The total memory bandwidth is greater than that of the sum of the ports, so that the small memory burst size inefficiency does not reduce throughput below acceptable levels. Write data is selectively masked to eliminate the need for read-modify-write cycles. Reads and writes can begin and end on arbitrary byte addresses, regardless of memory or bus widths.

BRIEF DESCRIPTION OF THE DRAWINGS

A complete understanding of the present invention may be obtained by reference to the accompanying drawings, when considered in conjunction with the subsequent detailed description, in which the same reference numbers refer to the same parts throughout the different views, and in which.

DETAILED DESCRIPTION OF THE PREFERRED EMBODIMENT

Generally speaking, the invention is a multi-port direct data flow memory architecture, which employs memory width greater than system bus width and memory speed greater than system bus speed to allow shallow burst depth and reduce other-port latencies, while maintaining multi-port throughput. The system has a data storage device (SDRAM) and a multiplexer connected to the SDRAM for memory to port data width matching. Two or more interfaces or ports are provided with data sourcing controllers respectively connected to the interfaces. A communications bus connects the SDRAM to the data sourcing controllers for facilitating data communications. A FIFO buffer memory is located between the multiplexer and the data sourcing controllers for memory speed to port speed matching. Read-ahead algorithms are provided that adapt the larger system bus burst sizes to the smaller memory burst sizes with the ability to cancel unneeded advance requests for data. The total memory bandwidth is greater than that of the sum of the ports, so that the small memory burst size inefficiency does not reduce throughput below acceptable, predetermined levels.

Algorithms are also provided to determine the best memory width and burst depth trade-off, based on the number of ports, the local bus width, and clock rate ratios. Moreover, a prefetch request/discard-abort algorithm is provided so that reads can be maintained after starting early data flow.

Figure 1:
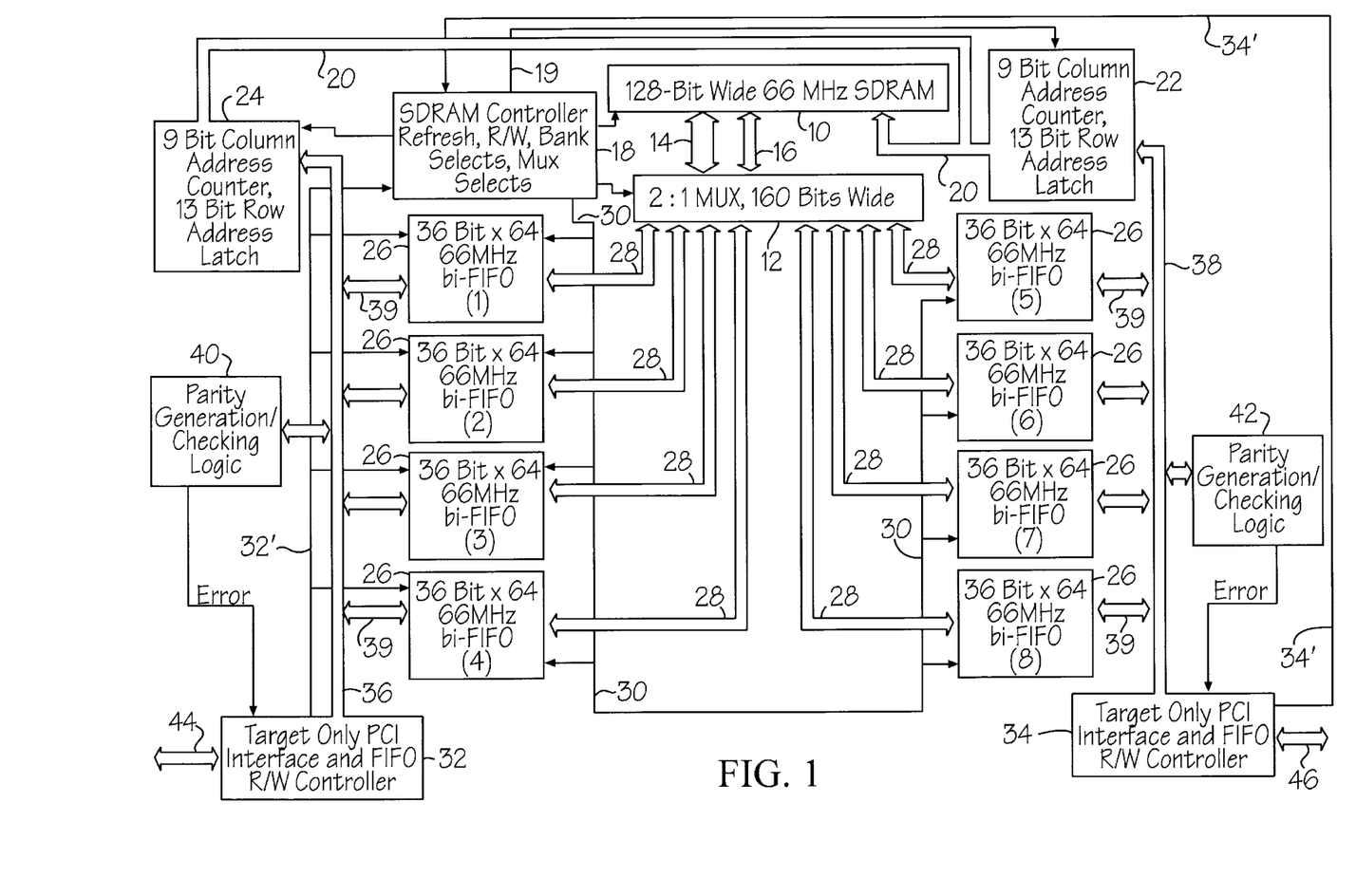
FIG. 1 is a block diagram of a dual-port memory architecture in accordance with the present invention.

Referring now to FIG. 1, there is shown a block diagram of the direct memory flow (bridge) architecture of this invention, using direct data flow memory. A memory device, such as a 128-bit wide, 66 Mhz SDRAM 10, is connected to a 2:1, 160-bit wide multiplexer 12. Data and mask information can be transferred between the memory 10 and the multiplexer 12 by means of data and mask lines 14 and 16, respectively. Also connected to memory 10 is a controller device 18, which performs SDRAM controller operations, refresh operations, read/write operations, bank select operations, and multiplexer select operations not only to memory 10, but also to multiplexer 12, to which it is connected. A set of address lines 20, connected to memory 10, is used to transfer address information from a pair of 9-bit column address counters 22, and 24, each also having a 13-bit row address latch. Each counter/latch is loaded from the PCI interface it is connected to. Counter/latch 22 is loaded from PCI interface 34, and counter/latch 24 is loaded from PCI interface 32. The memory controller 18 causes the loading to take place at the appropriate time, and permits one counter/latch at a time to present an address on the address lines 20.

Multiplexer 12 is bidirectionally connected to a set of eight FIFO buffers 26, each being 36-bit×64, 66 Mhz devices in the preferred embodiment, via respective 36-bit buses 28 that reserve 32 bits for data and 4 bits for mask information. It should be obvious that other bus speeds, path widths, etc. could also be used with proper design modifications. The FIFO buffers 26 are all connected to memory controller 18 by means of a control line 30. Four of the eight FIFO buffers are dedicated to each of the two PCI ports as can be seen in the diagram.

Two PCI interface and FIFO read/write (data sourcing) controller devices 32 and 34 are connected, via buses 36 and 38, to counters 24 and 22, respectively. The first PCI data sourcing controller 32 is also connected to memory controller 18 via line 32', while the second PCI data sourcing controller 34 is also connected to memory controller 18 via line 34'.

Connecting FIFO memory buffers 26 to respective PCI communications buses 36 and 38 are 36-bit channels for data (32 bits) and mask (4 bits), referred to as reference numeral 39, and described in greater detail hereinbelow.

A first parity checking logic device 40 is connected between the first PCI data sourcing controller 32 and its PCI communications bus 36; and a second parity checking logic device 42 is connected between second PCI data sourcing controller 34 and its communications bus 38.

Also connected to respective PCI data sourcing controllers 32 and 34 are PCI ports #1 and #2, reference numerals 44 and 46, as shown.

In operation, a PCI device on port #1, 44 begins a data write to memory. Another PCI device on port #2, 46, begins a PCI read. The data is written by the data sourcing controller 32 into one of the set of buffers 26 over its respective communications bus 36. When sufficient data has been moved, the consuming controller 34 is notified and programmed to read the data from the buffer 26 over the other communications bus 38. In this way, the data moves over each bus 36 or 38 only once.

In order to keep the latency on port #1 44 to a minimum when port #2 46 is performing its memory access, the burst depth is set to a low number, such as 2. In order to achieve the raw memory bandwidth required to maintain data flow at near peak PCI rates of 120 MB/sec, the width of the memory 10 is made four times the PCI width of 32 bits, and is operated at twice the PCI clock rate of 33 Mhz. Since the total worst case latency of the inventive architecture is about 10–12 PCI clock cycles worse case and about 3–5 PCI clock cycles average, split transactions (retries) are not required or generated.

All memory data accesses are 128 bits wide (wide words). All PCI transfers are no more than 32-bits wide (words). Bus width matching is performed by enabling only one of the four FIFO buffers 26 to transfer data to or from the 32-bit PCI data bus 28 at a time, while all four are enabled when transferring to or from the memory. In the case of a read from memory 10, two wide words, not shown, are placed in the FIFOs 26. Then 32-bit words are read out of the FIFOs 26 in sequence, seriatim, and placed on the internal connecting bus 36 or 38.

When writing to memory 10, the PCI bus 32-bit words are written sequentially into the four FIFOs 26. If the write is aligned on a 32-byte boundary, then port #1 FIFOs 26 are written in the sequence: 1, 2, 3, 4, 1, 2, 3, 4. When two wide words are in the FIFOs 26, then a burst of two wide words is generated into the SDRAM 10. Only during a burst of two wide words is the memory 10 unavailable to the opposite port. This represents a time duration of about six memory clock cycles, or three PCI clock cycles.

When less than eight PCI words are to be written to the memory 10, it is necessary to leave unmodified the memory locations within the two wide words of the SDRAM 10 that are not being written. Due to the nature of SDRAMs, the full burst of two must always be written or read from SDRAM 10.

Figure 2:
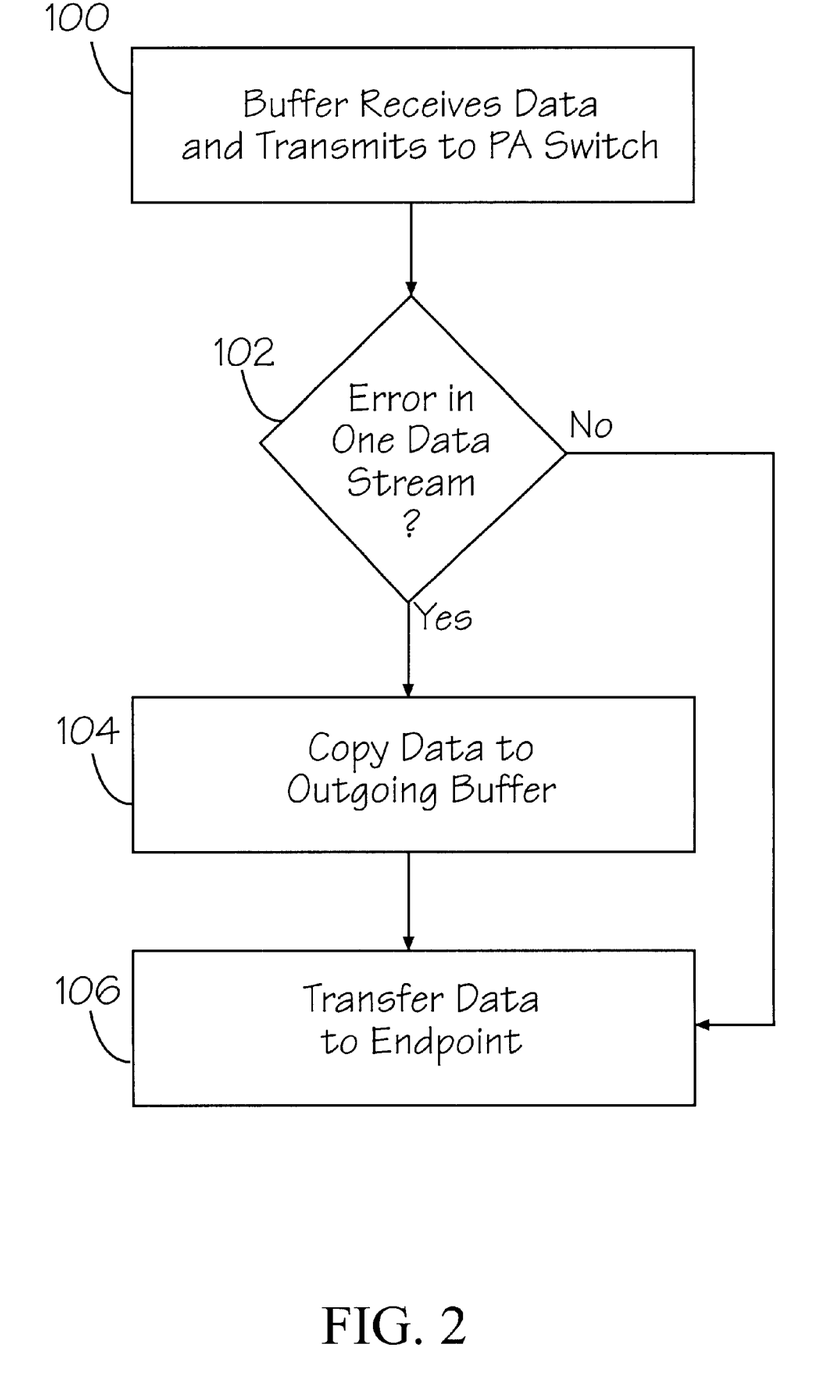
FIG. 2 is a flow chart of an algorithm used to accomplish a partial wide word write while still writing the entire wide word to memory.

Referring now to FIG. 2, a flow chart is shown to illustrate how the inventive system accomplishes the partial wide word write while still writing the entire wide word to SDRAM 10, without resorting to a read-modify-write. The mask bits of the SDRAM 10 (FIG. 1), in the bytes not being written are set to a value of "1", steps 102, 106, 110, or 114. The mask bits travel with the data bits and are presented to the SDRAM 10 at the same time the data is written. The presence of a mask bit of "1" inhibits the write. If the first word being written should appear in FIFO 2 (26), step 106, then when FIFO 2 is written, FIFO 1 (26) is also written, but with all four mask bits set to "1", step 108. If the PCI burst should end before the last word of the two wide words, step 120, then the remaining higher order words are also written with their mask bits set to "1", step 122. When the burst is sent to SDRAM 10, step 126, only those data bytes with the mask bits set to "0" modify the contents of SDRAM 10. The use of a read-modify-write is thus avoided. Partial word writes are accomplished in a similar fashion.

When reads of SDRAM 10 are performed, masking is unnecessary, since the data in SDRAM 10 is unmodified. If less than the total burst is required, the FIFOs 26 containing only the desired data are enabled in sequence to satisfy the PCI burst.

Figure 3:
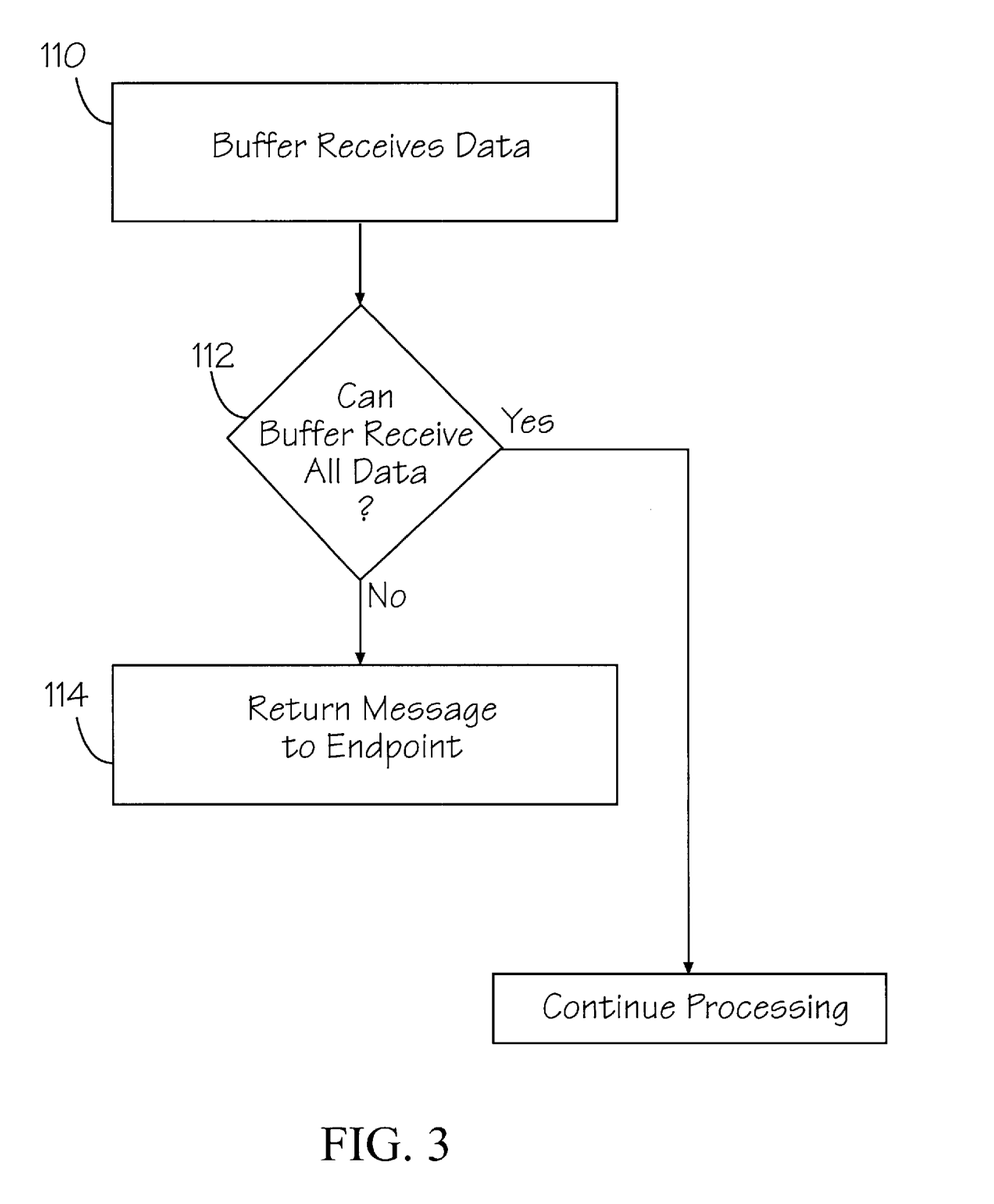
FIG. 3 is a flow chart of a prior art memory read algorithm.
Figure 4:
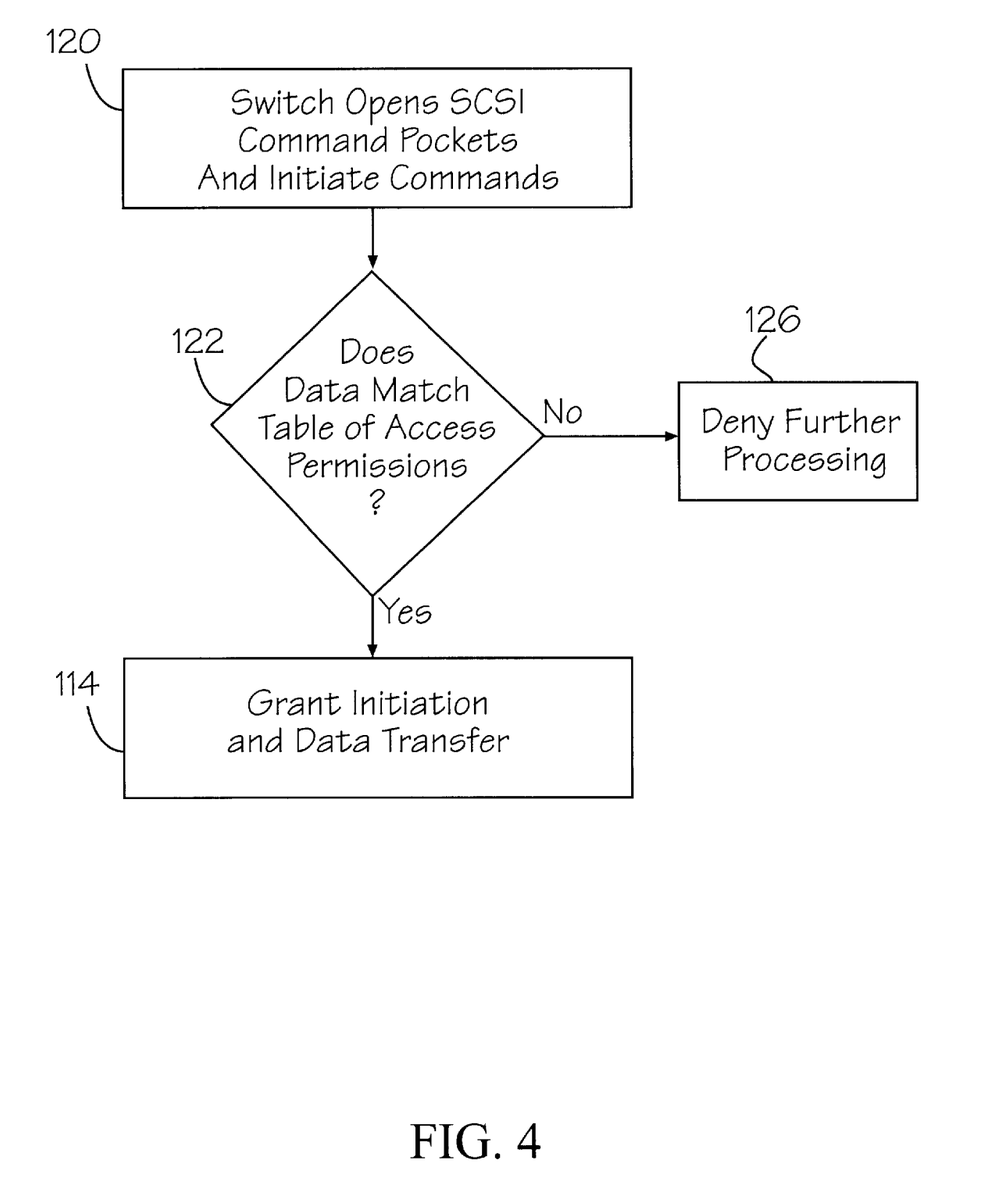
FIG. 4 is a flow chart of read-ahead algorithm for creating multiple memory bursts for a single PCI burst.

Referring now to FIG. 4, there is shown a flow chart to illustrate the inventive mechanism for creating multiple memory bursts for a single PCI burst. This is required in the common situation when PCI bursts exceed the 32 bytes available in a single SDRAM burst. This method differs from that employed by traditional PCI-to-PCI and processor-to-PCI bridges shown in FIG. 3, and is considerably more conservative of memory efficiency and bandwidth.

Traditional bridges read continuously into a FIFO 26 up to its full level, attempting to stay ahead of the device reading across the bridge. When the FIFO 26 is full, the bridge ceases transfer from memory into the FIFO. When the device reading across the bridge completes its burst, any remaining data in the FIFO 26 is discarded. Usually, this is nearly a full FIFO buffer of data, due to the algorithm. This results in wasted bandwidth in the memory 10 supplying the data, as well as in increased latency for other devices that share the memory 10. Additionally, if the PCI burst does not end before the FIFO runs out of data, then the target signals the master to disconnect, causing the master to re-try the remainder of the transfer and incur the full additional start-up latency for each time this occurs during the transfer.

The read-ahead method used in the present architecture is more adaptive than the simple "fill the FIFO" method used on most bridging and controller devices. Memory bursts are performed in increments smaller than those of the PCI busses 36 and 38. When a PCI burst begins, step 126, two memory bursts are requested of the SDRAM controller 18, step 128. Each of these requests results in one memory burst being written to the FIFOs 26, step 130. As the PCI device consumes a portion of the two wideword burst, an additional memory burst request is posted. The memory controller satisfies a posted request each time it has completed a posted request for the other ports in the system. As long as the requests are satisfied faster than the PCI can consume all of the date in the FIFO, wait states never occur. Since the requests are generated only as data is consumed the maximum amount of read-ahead is limited to less than a full FIFO 26 by the maximum number of memory burst requests that are posted. Since the number of memory burst reads posted or already satisfied and in the FIFO is no more than one or two, the amount to be discarded when the PCI burst completes, steps 128a and 128b, is much smaller than the traditional approach. Thus, the prefetch effectively tracks the PCI burst length and adapts to bus bursts of different lengths.

A number of complex relationships occurs as a function of the number of ports, the minimum PCI burst size, the PCI data width, the memory data width, and the memory burst depth. Using a set of algorithms specifically developed for this class of multi-port memories 10, the optimal settings for any application can be set deterministically and the worst case, best case, and average performance can be predicted accurately.

The derivation of those algorithms is discussed hereinbelow, and is optimized for use in a spreadsheet program. The goal is to find a weighted average for the amount of time (clock cycles) required for a port to access a given quantity of data, given statistical and random activity on the other ports. Since the frequency of a port accessing the shared memory 10 is a function of how quickly the PCI bus 36 and 38 can remove or add data to the FIFO buffers 26, the behavior of the PCI bus 36 and 38 determines how often the SDRAM 10 must service it.

The speed at which the SDRAM 10 can satisfy the request determines how much of the total time is spent servicing the requests, and how much of the time is idle. When the SDRAM 10 is idle, then a port 44 or 46 can gain immediate service, without waiting for the service of other ports to complete; latency is zero. Exactly how soon or late a request for service is entered when another request is being serviced determines the length of the wait or latency. If a request is entered at the beginning of service of another port, then the latency is maximum. If near the end of the service of another port, however, then the latency is minimum. Each possible quantum of overlap creates a different total number of wait states for the request to be started, and hence completed, resulting in a variable overhead and transfer rate for that request. The average overall possible combination is the weighted average of clock cycles per data burst across the PCI interface.

The derivation of the aforementioned algorithms is aided herein by defining the following constants as follows:
SDRW=Width of SDRAM, in bytes
SDRBST=SDRAM data transfer burst length
PCIXFW=PCI bus data transfer width, in bytes
PCIBST=PCI transfer data burst length
PCIOVH=PCI burst transfer non-data clock count (overhead clocks)
NPORTS=Number of memory ports
RARB=Number of SDRAM clocks required for a port to arbitrate for SDRAM access
WRC=Number of additional clock cycles that a SDRAM read burst takes over an SDRAM write burst PCC=Number of clocks required to precharge the SDRAM
RCP=SDRAM clock period=1/SDRAM clock frequency
PCP=PCI clock period=1/PCI clock frequency
FDFT=First data fall-through time from beginning of SDRAM burst to data available to PCI
The following variables are defined and derived as shown:

$$DQMB = \text{Quantity of data per } SDRAM \text{ memory burst}$$
$$= SDRW * SDRBST$$

BCRCB=Best case (minimum) SDRAM clock cycles per SDRAM data burst=RARB+3+WRC+(SDRBST−1)+PCC
WCRCB=Worst case (maximum) SDRAM clock cycles per SDRAM burst=BCRCB*NPORTS $$SPBW = SDRAM \text{ peak sustainable bandwidth}$$
$$= (SDRW * SDRBST)/(BCRCB * RCP)$$

PAMBW=Average available bandwidth per port; all ports at maximum activity=(SDRW*SDRBST)/(WCRCB*RCP)
MPCB=Minimum PCI clock cycles per SDRAM data burst, assuming no retries=[(SDRW*SDRBST)/(PCIXFW*PCIBST)]+PCIOVH
RIPC=SDRAM idle PCI clock cycles when all ports at maximum traffic=0 or =MPCB−[NPORTS*Round up(BCRCB/2)], whichever is greater.
MPWC=Maximum PCI wait clocks per burst, all ports at maximum load=(NPORTS−1)*round up[(BCRCB*FDFT)/2]

$$PSMR = PCI \text{ sustained maximum data rate}$$
$$= (PCIXFW * PCIBST)/[(PCIBST + PCIOVH) * PCP]$$

$$WCPBW = \text{worst case per port bandwidth}$$
$$= (PCIXFW * PCIBST)/(MPCB + MPWC)$$

WAPCB=Weighted average number of PCI clock cycles per PCI burst, assuming random port collisions while accessing SDRAM=[{MPCB*(RIPC+MPWC+1)}+{MPWC*(MPWC+1)/2}]/(RIPC+MWPC+1)

$$WAPBW = \text{Weighted average per port available bandwidth}$$
$$= (PCIXFW * PCIBST)/(WAPCB * PCP)$$

The algorithm consists of creating a spreadsheet that calculates the values of the variables given above based on the constants supplied by the designer. Typically, the designer assigns values to variables SDRW, PCIXFW, PCIOVH, NPORTS, RARB, WRC, PCC, RCP, PCP, and FDFT. The designer then inputs a list of values for PCIBST and SDRBST and the spreadsheet generates the values for WAPBW and WCPBW as sets of 3-D surfaces. Then, SDRW and PCIXFW are varied to create other sets of surfaces. From the full set of surfaces and the characteristics of the PCI devices expected, the optimal values for the constants may be selected, guiding the implementation of the architecture and delivering the required performance within the physical limitations of the components and clock rates selected.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A high-speed, multiport memory architecture for use with a processor, comprising:
   a) a first interface adapted for bi-directional connection to a first external data bus said first external data bus having a first data path width and a first data bus speed, said bi-directional connection being made through a first I/O port, said first interface having a second, bi-directional I/O port configured for bi-directional communication with a first internal data bus, and said first interface comprising a data sourcing controller;
   b) a second interface adapted for bi-directional connection to a second external data bus, said second external data bus having a second data path width and a second data bus speed, said bi-directional connection being made through a first I/O port, said second interface having a second, bi-directional I/O port configured for bi-directional communication with a second internal data bus, said second interface comprising a data consuming controller;
   c) a first plurality of bi-directional FIFO buffers each having a first buffer I/O port operatively connected to a first internal data bus and a second buffer I/O port configured for connection to a multiplexer;
   d) a second plurality of bi-directional FIFO buffers each having a first buffer I/O port operatively connected to a second internal data bus and a second buffer I/O port configured for connection to a multiplexer;
   e) a multiplexer having a plurality of inputs, each being connected to respective bi-directional FIFO buffers of said first and second plurality of bi-directional FIFO buffers;
   f) a memory operatively connected to said multiplexer, said memory having a data path width greater than said data path widths of said first external data bus and said second external data bus and a speed greater than said bus speed of said first external data bus and said external data bus;
   whereby data on said first external data bus is transferred to said second external data bus through: said first interface, said first internal data bus, at least one of said first plurality of bi-directional FIFO buffers, said memory, at least one of said second plurality of bi-directional FIFO buffers, said second internal data bus and said second interface.

2. The high-speed, multiport memory architecture for use with a processor, as recited in claim 1, wherein data is transferred from one of said first and said second interfaces to the other of said first and said second interfaces, each of said first and second interfaces being selectively operable as a data source and a data target.

3. The high-speed, multiport memory architecture for use with a processor, as recited in claim 2, wherein said first and said second interfaces further comprise a read/write controller and a FIFO buffer.

4. The high-speed, multiport memory architecture for use with a processor, as recited in claim 3, further comprising:
   g) a memory controller operatively connected to said memory for controlling data organization therein.

5. The high-speed, multiport memory architecture for use with a processor, as recited in claim 4, wherein said memory controller is also operatively connected to said multiplexer.

6. The high-speed, multiport memory architecture for use with a processor, as recited in claim 5, wherein said memory controller is also operatively connected to at least one of said data sourcing controller and said data consuming controller.

7. The high-speed, multiport memory architecture for use with a processor, as recited in claim 2, wherein a product of said memory data path width and said memory operating speed defines a bandwidth.

8. The high-speed, multiport memory architecture for use with a processor, as recited in claim 2, wherein said memory data path width is approximately four times said data path width of said first external data bus and said memory operating speed is approximately twice said data bus speed of said first interface and said second interface.

9. The high-speed, multiport memory architecture for use with a processor, as recited in claim 8, wherein at least one of said first and said second external data buses comprises a PCI data bus.

10. The high-speed, multiport memory architecture for use with a processor, as recited in claim 9, wherein said data path width is approximately 32 bits and said data bus speed is approximately 33 megahertz (MHz).

11. The high-speed, multiport memory architecture for use with a processor, as recited in claim 10, wherein said memory data path width is approximately 128 bits and said memory operating speed is approximately 66 MHz.

12. The high-speed, multiport memory architecture for use with a processor, as recited in claim 2, wherein data is transferred from one of said first and said second interfaces to the other of said first and said second interfaces in data bursts, said-data bursts each having a burst depth.

13. The-high-speed, multiport memory architecture for use with a processor, as recited in claim 12, wherein said data burst depth is variable.

14. The high-speed, multiport memory architecture for use with a processor, as recited in claim 13, wherein said data burst depth is optimized to prevent retries from said consuming one of said first and said second interfaces.

15. The high-speed, multiport memory architecture for use with a processor, as recited in claim 14, wherein said prevention of retries is accomplished at least in part by at least one of the operations: data prefetching, demand based data posting and cancellation of unneeded data fetching.

16. The high-speed, multiport memory architecture for use with a processor, as recited in claim 2, wherein at least one of said first plurality of bi-directional FIFO buffers comprises four bi-directional FIFO buffers.

17. The high-speed, multiport memory architecture for use with a processor, as recited in claim 16, wherein said first and said second plurality of bi-directional FIFO buffers are adapted for connection to respective first and said second internal data buses, such that buffers receive data from their respective internal data bus and substantially simultaneously discharge data therefrom to said multiplexer.

18. The high-speed, multiport memory architecture for use with a processor, as recited in claim 16, wherein said first and said second plurality of bi-directional FIFO buffers are adapted for connection to said multiplexer such that said buffers receive data substantially simultaneously from said multiplexer and serially discharge data to respective first and said second internal data buses.

19. The high-speed, multiport memory architecture for use with a processor, as recited in claim 2, wherein bandwidth of said memory is at least twice the sum of the bandwidths of said first external data bus and said second external data bus, said bandwidth being defined as a product of said data path width in bytes and said operating speed in MHz.

20. The high-speed, multiport memory architecture for use with a processor, as recited in claim 2, wherein said memory data path width and said memory operating speed are optimized to maximize data transfer throughput from said first external data bus to said second external data bus.

* * * * *